US005647201A

United States Patent [19]

Hook et al.

[11] Patent Number: 5,647,201

[45] Date of Patent: Jul. 15, 1997

[54] CAVITATING VENTURI FOR LOW REYNOLDS NUMBER FLOWS

[75] Inventors: Dale L. Hook; Hermann W. Behrens, both of Rancho Palos Verdes; Kiran R. Magiawala, Hawthorne, all of Calif.

[73] Assignee: TRW Inc., Redondo Beach, Calif.

[21] Appl. No.: 510,223

[22] Filed: Aug. 2, 1995

[51] Int. Cl.[6] .......... F02K 9/52

[52] U.S. Cl. .......... 60/258; 138/44

[58] Field of Search .......... 60/39.462, 218, 60/257, 258; 138/44

[56] References Cited

U.S. PATENT DOCUMENTS

| | | | |
|---|---|---|---|
| 2,175,160 | 10/1939 | Zobel et al. . | |
| 2,373,309 | 4/1945 | Hamilton . | |
| 3,297,256 | 1/1967 | Hickerson et al. . | |
| 3,299,937 | 1/1967 | Cook . | |
| 3,314,612 | 4/1967 | Anthes et al. . | |
| 3,403,862 | 10/1968 | Dworjanyn . | |
| 3,736,797 | 6/1973 | Brown . | |
| 3,823,408 | 7/1974 | Gordon, III . | |
| 3,982,605 | 9/1976 | Sneckenberger . | |
| 4,150,540 | 4/1979 | Krayenbuhl et al. . | |
| 4,184,638 | 1/1980 | Ogasawara et al. . | |
| 4,185,706 | 1/1980 | Baker, III et al. . | |
| 4,455,166 | 6/1984 | Brancaz et al. . | |
| 4,528,847 | 7/1985 | Halmi . | |
| 4,545,317 | 10/1985 | Richter et al. . | |
| 4,545,535 | 10/1985 | Knapp | 239/313 |
| 4,621,931 | 11/1986 | Jensen | 384/114 |
| 4,798,339 | 1/1989 | Sugino et al. . | |
| 4,806,172 | 2/1989 | Adaci et al. . | |
| 4,944,163 | 7/1990 | Niggemann . | |
| 5,125,582 | 6/1992 | Surjaatmadja et al. . | |
| 5,417,049 | 5/1995 | Sackheim | 60/260 |

FOREIGN PATENT DOCUMENTS 50-149431 12/1975 Japan .

*Primary Examiner*—Louis J. Casaregola
*Attorney, Agent, or Firm*—Michael S. Yatsko

[57] ABSTRACT

Disclosed is a low flow, low Reynolds number cavitating venturi. This cavitating venturi includes an inlet for receiving a liquid at an upstream pressure and an outlet for discharging the liquid received by the inlet at a downstream pressure. The liquid passes through a converging portion having a converging sidewall which extends from said inlet, through a throat portion having a throat sidewall and a diverging diffuser portion having a diverging sidewall. The cavitating venturi provides a substantially stable liquid flow rate independent of the downstream pressure up to a downstream pressure at least as high as 80% of the upstream pressure at a Reynolds number of 60,000 or less.

19 Claims, 3 Drawing Sheets

CAVITATING VENTURI FOR LOW REYNOLDS NUMBER FLOWS

BACKGROUND OF THE INVENTION

1. Field of the Invention

This invention relates generally to cavitating venturis and, more particularly, to small cavitating venturis designed to operate at low Reynolds number (Re) flows of less than about 60,000.

2. Discussion of the Related Art

Cavitating venturis are widely used for the purpose of controlling liquid flow rates in fluid flow systems. Essentially, a venturi is a nozzle having a minimum area throat section between two tapered sections. Specifically, the typical textbook venturi is comprised of a long conical converging section in which the fluid total head is converted to a velocity head, a minimum area throat in which the fluid static pressure is equal to or less than the fluid vapor pressure, and a shallow angle conical divergent section in which the fluid velocity head is converted back to pressure head in a low-loss process. In other words, the throat diameter of the typical cavitating venturi is sized such that the static pressure of the fluid is equal to or below the vapor pressure of the flowing fluid, thus causing the fluid or liquid at the throat to form gaseous phase bubbles which travel at sonic speeds.

By allowing the flowing liquid to vaporize or cavitate at the nozzle throat, the influence of downstream pressure variations on flow rate is eliminated. That is, fluid flow rate is no longer dependent upon the pressure difference across the venturi, but is dependent upon upstream pressure alone. Once this condition occurs, the flow rate and upstream pressure are independent of the downstream pressure. In the typical textbook, high flow, high Reynolds number (i.e. Re greater than 60,000) cavitating venturi design, this condition of cavitation and flow control can be maintained with the downstream pressure being as high as 80% of the upstream pressure. In such a case, 20% of the total pressure at the venturi inlet is lost in nonrecoverable losses. The venturi is thus said to have a pressure recovery capability of 80%.

However, when such conventional textbook designs are applied to very small, low flow venturis having a Reynolds number of 60,000 or less and venturi throat diameters of about 0.020 inch or less, serious problems are encountered. Specifically, such venturies have been shown to demonstrate both poor pressure recovery and unpredictable flow control (bistability). Measurements of pressure recovery in which loss of flow control at downstream pressures as low as 50% of the upstream pressure have been observed (i.e. 50% of the total inlet pressure is lost in the process). Bistable operation in which the venturis operate in two distinct modes, differing in flow rate for a given or fixed upstream pressure by as much as 15% is also a common occurance. It is postulated that this bistability results from a hydraulic instability in which the vena contracta (minimum effective area) moves from within the throat area to downstream of the throat in a chaotic unpredictable fashion.

What is needed then is a low flow, low Reynolds number (i.e.: $Re \leqq 60{,}000$) cavitating venturi which does not suffer from the above-identified disadvantages. Such a design must eliminate the poor pressure recovery, increase flow control at downstream pressures at least as high as 80% of the upstream pressure and prevent the cavitating venturi from becoming bistable or operating in two distinct modes differing in flow rates. It is, therefore, an object of the present invention to provide such a cavitating venturi.

SUMMARY OF THE INVENTION

In accordance with the teachings of the present invention, a cavitating venturi for operation at low Reynolds number flow is disclosed. The cavitating venturi is capable of providing a substantially stable liquid flow rate at a Reynolds number of about 60,000 or less (i.e. $Re \leqq 60{,}000$) independent of downstream pressure up to a downstream pressure at least as high as 80% of an upstream pressure. This is basically achieved by using a nonconventional geometry for the cavitating venturi.

In one preferred embodiment, the cavitating venturi includes an inlet for receiving a liquid at an upstream pressure. A converging portion extends from the inlet and is defined by a converging sidewall such that the converging portion has a length $L_C$. A throat portion extends from the converging portion and is defined by a throat sidewall such that the throat portion has a length $L_T$ and a diameter $D_T$. The length $L_C$ divided by the diameter $D_T$ being less than 0.25 and the length $L_T$ divided by the diameter $D_T$ being less than 0.20. A diverging diffuser portion extends from the throat portion and is defined by a diverging sidewall. The liquid received by the inlet is discharged at an outlet at a downstream pressure. This allows the cavitating venturi to provide a substantially stable liquid flow rate independent of the downstream pressure, up to a downstream pressure at least as high as 80% of the upstream pressure at a Reynolds number of about 60,000 or less.

Use of the present invention provides a low flow, low Reynolds number cavitating venturi which provides a substantially stable liquid flow rate at Reynolds numbers of about 60,000 or less and a pressure recovery of at least 80%. As a result, the aforementioned disadvantages associated with the typical textbook cavitating venturi has been substantially eliminated.

BRIEF DESCRIPTION OF THE DRAWINGS

Still, other advantages of the present invention will become apparent to those skilled in the art after reading the following specification and by reference to the following drawings in which:

FIG. 7 is a partial side cross-sectional view of a thruster which utilizes the cavitating venturi of the present invention; and FIG. 8 is an enlarged cross-sectional view of one cavitating venturi installed in the thruster of FIG. 7.

DETAILED DESCRIPTION OF THE PREFERRED EMBODIMENT

The following description of a cavitating venturi for low Reynolds number flows is merely exemplary in nature and is in no way intended to limit the invention or its application or uses. Moreover, while this invention is described below in connection with a rocket thruster, those skilled in the art would readily recognize that the cavitating venturi can be utilized with various other systems and in various other environments. For example, the cavitating venturi can be used to control fuel in automotive injectors, hydraulic fluid in servo loops, and liquid flows in chemical and medical processes.

Figure 1:
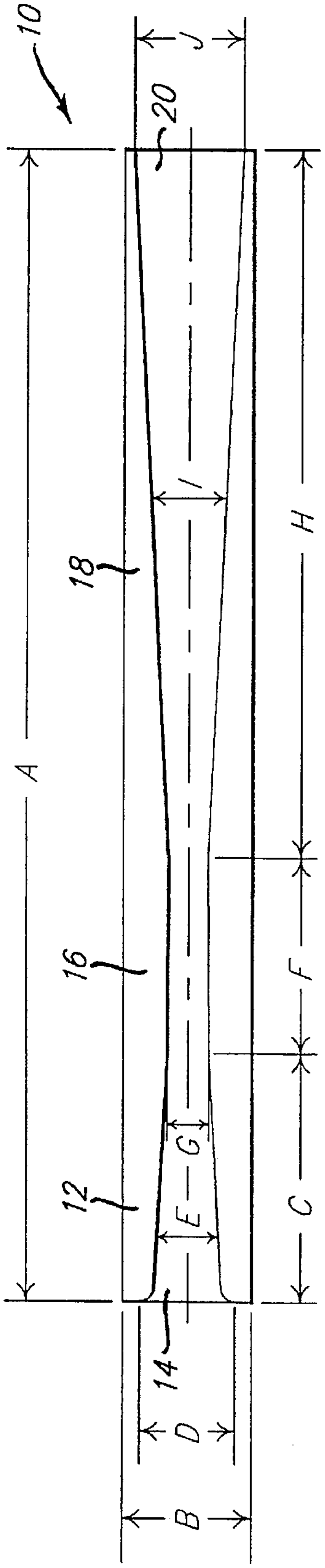
Prior Art Fig. 1
FIG. 1 is a side cross-sectional view of a prior art cavitating venturi designed for operation with high Reynolds number flows.

Referring now to FIG. 1, a cross-sectional view of a typical prior art cavitating venturi 10 based on parameters optimized for high Reynolds number operation is shown. The venturi 10 has an overall length A of about 14 inches and an overall width or diameter B of about 1.75 inches. The venturi 10 includes a converging section 12 having a length C of about 3 inches and an inlet 14 having a diameter D of about 1.5 inches, tapering at an overall inlet angle E of about 8° to 10°. Following the converging section 12 is a throat section 16 having a length F of about 2 inches which narrows to a diameter G of about 0.5 inches. The throat section 16 extends to a diverging diffuser section 18 which has a length H of about 9 inches and an overall diverging angle I of about 6° to 8° to form an outlet 20 having a diameter J of about 1.5 inches.

While the venturi 10 has been described above with specific dimensions, those skilled in the art would recognize that the typical venturi 10 can have numerous other dimensions having the same overall configuration. For instance, referring to the earlier definitions of $L_C$, $L_T$, and $D_T$. A conventional venturi 10 has a value $L_C$ being typically 5 to 10 times the diameter $D_T$ and the length $L_T$ being typically 3 to 10 times the diameter $D_T$. Moreover, the outlet diameter 20 is typically approximately 3 to 10 times the throat diameter $D_T$.

The venturi 10 described above is a typical high flow, high Reynolds number cavitating venturi which operates very successfully at a Reynolds number greater than 60,000. The Reynolds number referred to herein is known in the art as a dimensionless parameter which determines the behavior and characteristics of fluid flows in ducts and pipes.-and is defined by:

$$Re = \frac{\rho V D_T}{\mu},$$

where ρ is fluid density, V is stream velocity, $D_T$ is throat diameter and μ is fluid viscosity. The high Reynolds number (i.e. greater than 60,000) results because of the high flow (i.e. stream velocity V) and larger diameter throat 16 ($D_T$). For example, assuming we have $H_2O$ as a working fluid with a liquid density ρ of 62.4 lb./ft$^3$, a stream velocity V of 211 ft/sec. and a fluid visocity μ of $6.7\times10^{-4}$ lb./ft.sec. with $D_T$=G=0.5 inches, we would have a Reynolds number of 819,000.

The cavitating venturi 10 operates as follows. The total fluid pressure of the liquid or fluid (not shown) entering the inlet 14 comprises essentially the static pressure of the fluid plus a velocity pressure (i.e. Bernoulli's equation states the following:

$$\text{Total Pressure} = P_s + \frac{\rho V^2}{2g},$$

where $P_S$=static pressure, ρ=fluid density, V=fluid velocity, and g=gravitation constant). For example, assume that the liquid or fluid entering the inlet 14 has a total pressure of about 300 lbs. per square inch (psi) and is traveling at about two (2) feet per second (ft/s). As the fluid flows through the converging section 12, its velocity increases and the total pressure remains essentially constant at 300 psi. At the throat section 16, the velocity increases to about 211 ft/s resulting in the static pressure ($P_S$) becoming very low or negligible, while the velocity pressure ($\rho V^2/2g$) increases to about the total pressure (i.e. 300 psi). As local velocity increases, the static pressure decreases to a level below the vapor pressure or flash point of the fluid, causing the fluid to vaporize or cavitate. When the liquid flashes to vapor, the volumetric flowrate is greatly increased, increasing the local velocity to sonic speeds. These vaporized bubbles traveling at sonic speeds prevent pressure waves downstream from traveling upstream, thereby isolating the downstream pressure. As the vapor bubbles enter the diverging diffuser section 18, the velocity decreases and the static pressure increases above the vapor pressure. This causes vapor or gaseous bubbles to condense to a liquid and the fluid exits the outlet 20 at about 2 ft/s and 240 psi. Hence, the venturi 10 is said to have a pressure recovery of 80%. That is, 20% of the initial pressure is lost as nonrecoverable losses.

Figure 3:
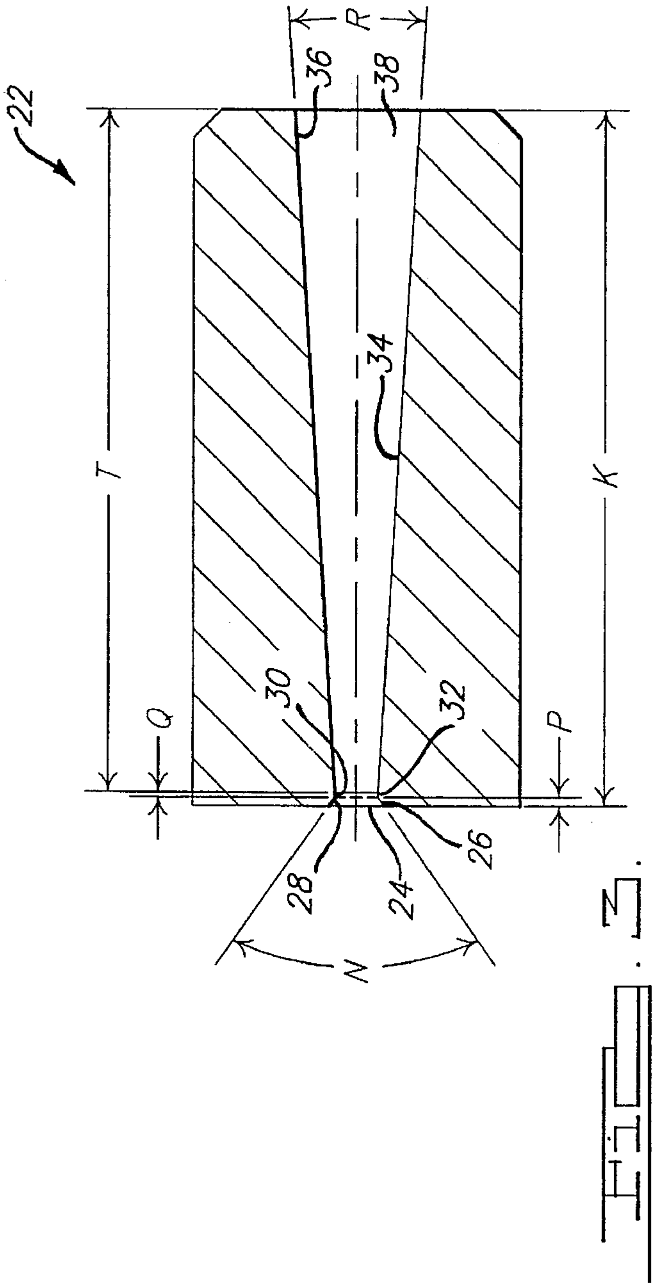
FIG. 3 is a side cross-sectional view of the embodiment shown in FIG. 2 taken along line 3—3 of FIG. 2.
Figure 2:
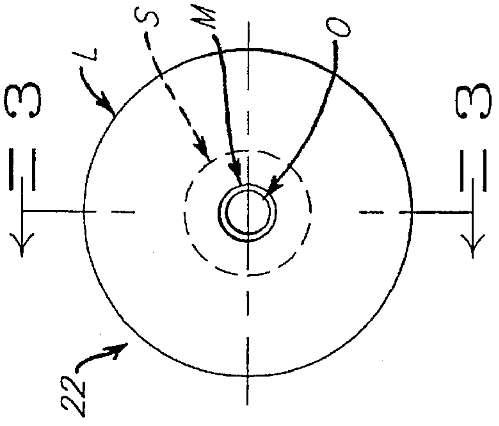
FIG. 2 is a front view of one preferred embodiment of a cavitating venturi of the present invention looking into a converging inlet of the cavitating venturi.

Turning to FIGS. 2 and 3, a front view and a side cross-sectional view of a preferred embodiment of a cavitating venturi 22 of the present invention, is shown. The cavitating venturi 22 is preferably constructed of stainless steel having a standard machine finished surface. The cavitating venturi 22 may also be constructed of other suitable materials depending on the environment for which the cavitating venturi 22 will be employed. The cavitating venturi 22 has an overall length K of about 0.25 inches and an overall width or diameter L of about 0.12 inches.

The cavitating venturi 22 includes an inlet 24 and a converging portion 26 extending from the inlet 24 which is defined by a converging sidewall 28. The inlet 24 has an initial inlet diameter M of between about 0.015 to 0.025 inches that converges at an overall angle N of between about 55° to 65° to a throat sidewall 30 at a throat portion 32, where the throat diameter ($D_T$) O is between about 0.01 to 0.02 inches. The length P of the converging portion ($L_C$) is between about 0.002 and 0.004 inches and the length Q of the throat portion 32 ($L_T$) is between about 0.001 and 0.003 inches. After the throat portion 32, there is a diverging diffuser portion 34 formed by a diverging sidewall 36. The diverging sidewall 36 begins at the throat sidewall 30 and diverges at an overall angle R of between about 6° to 8° to form an outlet 38 having a diameter S of between about 0.048 to 0.050 inches. The overall length T of the diverging section 24 is between about 0.243 and 0.247 inches.

While the cavitating venturi 22, as shown in FIGS. 2 and 3 has been described above in reference to specific dimensions, it would be understood by those skilled in the art that the cavitating venturi 22 is not strictly limited to these specific dimensions. Moreover, as long as the dimensions of the cavitating venturi 22 has the following geometric relationships, the cavitating venturi 22 will eliminate the disadvantages discussed above for low flow, low Reynolds number cavitating venturis. Specifically, the cross-sectional area of the outlet ($A_O$) 38 divided by the cross-sectional area of the throat portion ($A_T$) 32 should be equal to or greater than 10. For example, with S equal to 0.048 inches and O equal to 0.015 inches, we have:

$$\frac{A_O}{A_T} = \frac{\text{area of outlet}(\pi r^2)}{\text{area of throat}(\pi r^2)} = \frac{\pi (S/2)^2}{\pi (O/2)^2} = 10.24$$

$$\rightarrow 10.24 \geqq 10$$

The length of the throat portion 36 (i.e. $L_T$=Q) divided by the diameter of the throat (i.e. $D_T$=O) should be less than 0.2. For example, with Q equal to 0.002 inches and O equal to 0.015 inches, we have:

$$\frac{L_T}{D_T}=\frac{Q}{O}=\frac{.002}{.015}=.13\therefore\frac{L_T}{D_T}<.2$$

The length of the converging portion 32 (i.e. $L_C$=P) divided by the diameter of the throat (i.e. $D_T$=O) should be less than 0.25. For example, with P equal to 0.003 inches and O equal to 0.015 inches, we have:

$$\frac{L_C}{D_T}=\frac{P}{O}=\frac{.002}{.015}=.2\therefore\frac{L_C}{D_T}<.25$$

In addition, the diverging angle R should be between about 6° and 8° and the converging angle N should be between about 55° and 65°. A low flow, low Reynolds number cavitating venturi having the geometric relationship, as set forth above, will provide pressure recovery of at least 80% and operate in a single stable mode for Reynolds numbers of about 60,000 or less.

Figure 4:
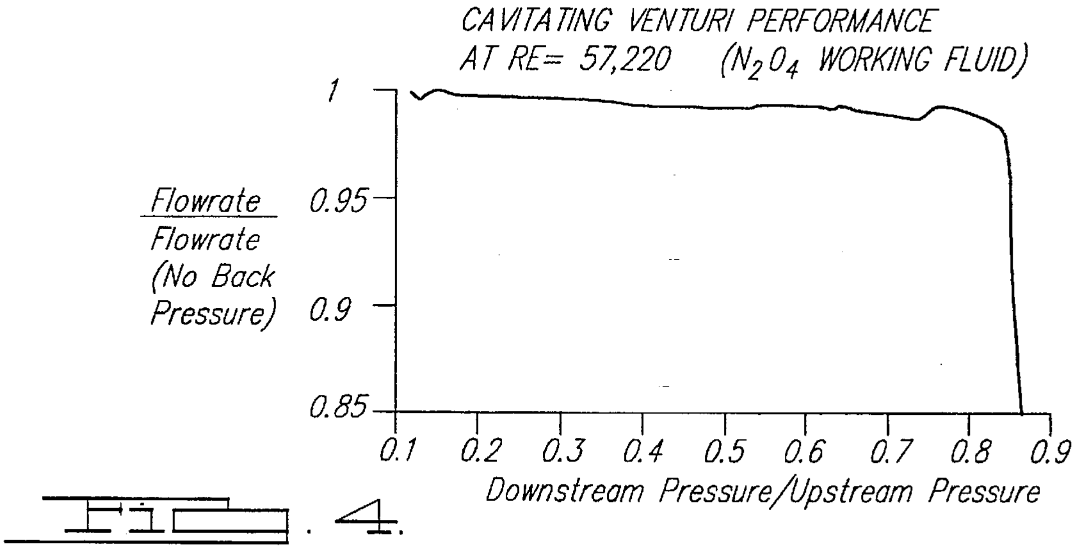
FIGS. 4–6 illustrate the flow stability and pressure recovery of the cavitating venturi shown in FIGS. 2 and 3 operating at 3 different values of Reynolds number (Re)
Figure 5:
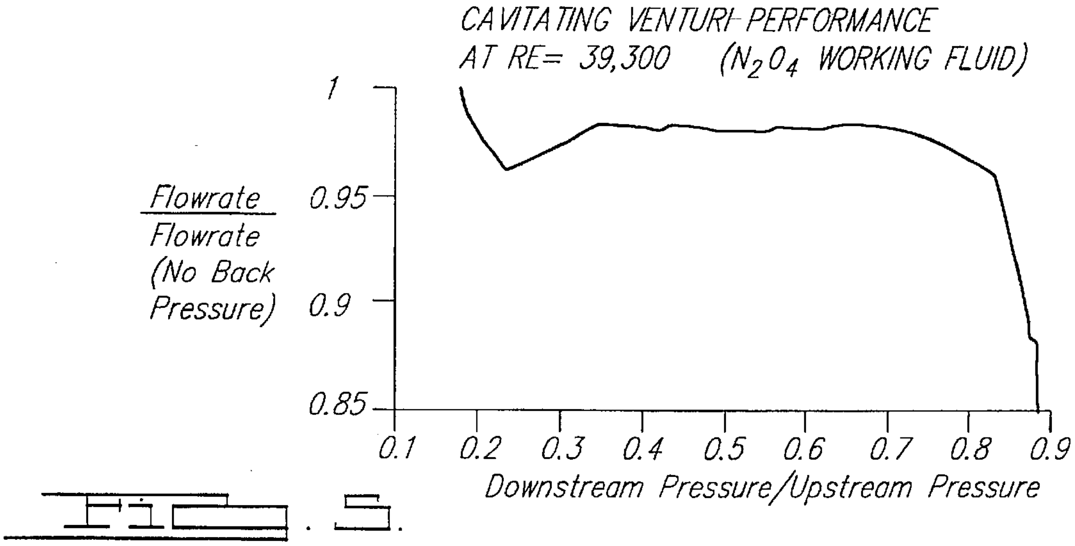
Figure 6:
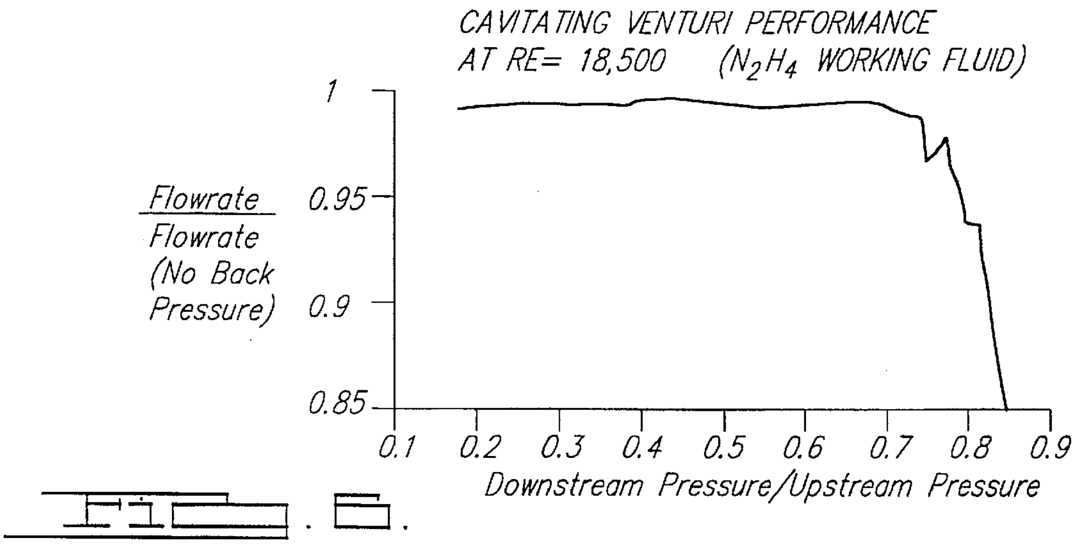
Figure 4:
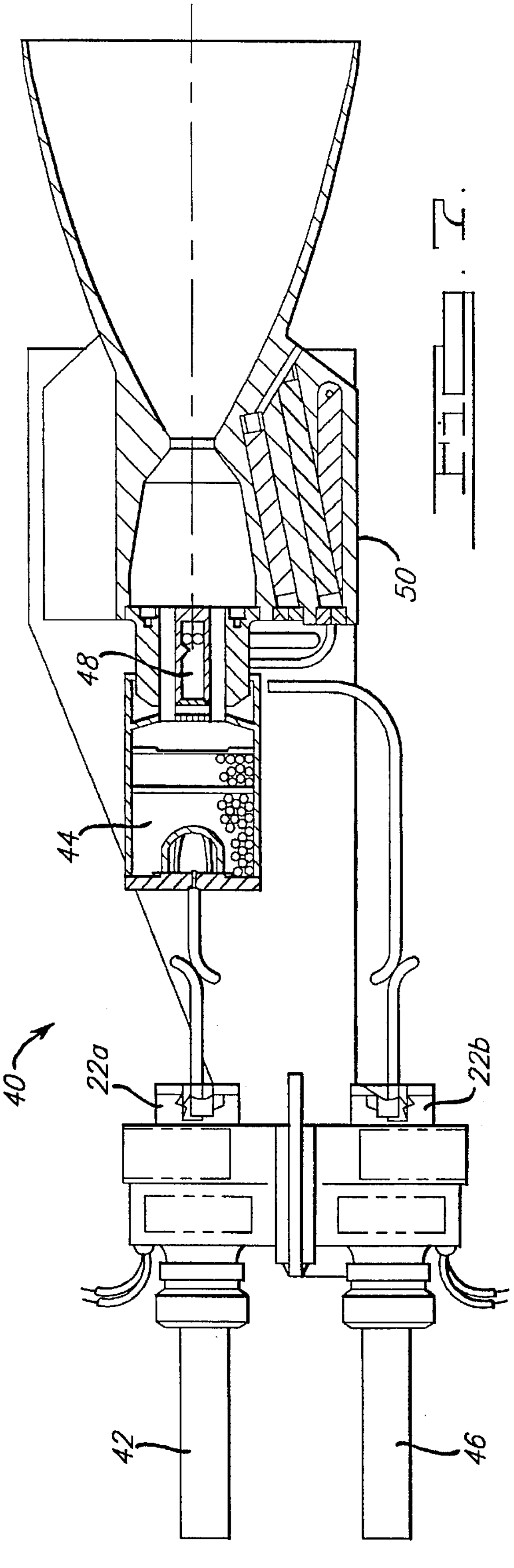
Figure 5:
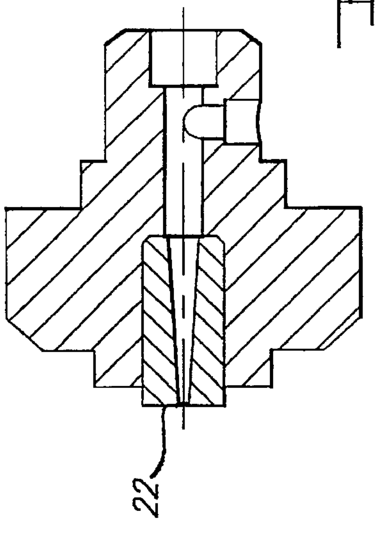

Turning to FIGS. 4–6, test results on the operation of the cavitating venturi 22, over a broad range of inlet pressures, are shown. The horizontal axis of the graphs shown in FIGS. 4–6 represents the pressure recovery ratio or pressure downstream (i.e. $P_D$) over pressure upstream, (i.e. $P_D$). On the vertical axis is the flow rate at the recovery ratio (i.e. $P_D/P_U$) over the maximum flow rate with no back pressure, also known as the normalized or ambient flow rate. FIG. 4 shows the venturi performance at a Reynolds number of 57,220 having an upstream inlet pressure of 214 psi and a throat diameter $D_T$=0.015 inch. FIG. 5 shows the venturi performance at a Reynolds number of 39,300 having an upstream inlet pressure of 110 psi and a throat diameter $D_T$=0.015 inch. FIG. 6 shows the venturi performance at a Reynolds number of 18,500 having an upstream inlet pressure of 134 psi and a throat diameter $D_T$=0.014 inch. The working fluid used in FIGS. 4 and 5 is $N_2O_4$. The working fluid used in FIG. 6 is $N_2H_4$. FIGS. 4–6 show that the cavitating venturi 22 maintains 95% of its flow with a downstream pressure up to 80% of the upstream pressure, more specifically, at up to about 0.84 pressure recovery. At pressure ratio's greater than 0.84, cavitation is essentially suppressed such that a flow is no longer only dependent upon the upstream inlet 28 pressure, but is only dependent upon the downstream pressure. During the flow tests which generated FIGS. 4–6, only a single stable flow result was observed with no bistability occuring.

A rocket thruster 40, is shown in FIG. 7, which may utilize two (2) cavitating venturis 22a and 22b, of the present invention. The thruster 40 is described in detail in U.S. Pat. No. 5,417,049, application Ser. No. 07/748,990, filed Aug. 21, 1991 and application Ser. No. 07/511,153, filed Apr. 19, 1990, which are each hereby incorporated by reference. The thruster 40 operates in either a monopropellant mode or a bipropellant mode. In the monopropellant mode, only a single cavitating venturi 22a is utilized to regulate the flow of fuel, such as hydrazine ($N_2H_4$) from an inlet line 42 into a decomposition chamber 44. In the bipropellant mode, the cavitating venturi 22a controls the flow of fuel into the decomposition chamber 44, while a second cavitating venturi 22b controls the flow of an oxidizer, such as nitrogen tetroxide ($N_2O_4$) from an inlet line 46 into a central portion 48 of a thrust chamber 50. FIG. 8 shows a partial cross-sectional view of the cavitating venturis 22a and 22b mounted within the thruster 40.

For exemplary purposes only, in the monopropellant mode, the upstream inlet pressure at inlet line 42 may be about 325 psi, while the downstream pressure at the decomposition chamber 44 may be about 45 psi. In the bipropellant mode, the upstream pressure at inlet lines 42 and 46 may be about 325 psi, while the downstream pressure in the decomposition chamber 44 may be about 150 psi and about 200 psi in the central portion 48 of the thruster chamber 50. Since the thruster 40 may operate in either a monopropellant or bipropellant mode depending on the particular needs, the cavitating venturis 22a and 22b isolate the downstream pressures so that flow control is only dependent upon the upstream pressures at inlet lines 42 and 46 which can be readily controlled and monitored. The cavitating venturis 22a and 22b are capable of providing a stable flow independent of the downstream pressure up to a downstream pressure of at least as high as 80% of the upstream pressure at any Reynolds number, but are best suited to operate at a Reynolds number of about 60,000 or less. This allows the thruster 40 to switch between the monopropellant or bipropellant phase while providing a stable flow independent of the pressures in the decomposition chamber 44 or the central portion 48 of the thrust chamber 50.

In operation, the cavitating venturis 22a and 22b operate similar to the cavitating venturi 10, shown in FIG. 1. As the fuel flows through the cavitating venturi 22a or the oxidizer flows through the cavitating venturi 22b, at a rate of about 0.01 lbs/sec., the liquid fuel or oxidizer vaporizes and forms gaseous bubbles in the throat portion 32 which travel at sonic speeds and then condense in the diverging diffuser portion 34 such that 95% of the original flow is maintained up to a downstream pressure of at least 0.80 of the upstream pressure. Moreover, the cavitating venturis 22a and 22b operate in a single stable mode so that the flow does not toggle between two distinct flows. A typical Reynolds number for the low flow cavitating venturi 22a would be 18,000, assuming that the hydrazine ($N_2H_4$) has a fluid density ρ of 62.2 lb./ft.$^3$, a stream velocity V of 140 ft/sec. and a fluid viscosity μ of $5.75\times10^{-4}$ lb./ft. sec., with a throat diameter of about 0.015 inches. The Reynolds number for the low flow cavitating venturi 22b would be 39,000, assuming that the nitrogen tetroxide ($N_2O_4$) has a fluid density ρ of 90 lb/ft.$^3$, a stream velocity V of 98 ft./sec. and a fluid viscosity μ of $2.8\times10^{-4}$ lb./ft.sec., with a throat diameter of about 0.015 inches.

The foregoing discussion discloses and describes merely exemplary embodiments of the present invention. One skilled in the art would readily realize from such a discussion, and from the accompanying drawings and claims, that various changes, modifications and variations can be made therein without departing from the spirit and scope of the invention, as defined by the following claims.

What is claimed is:

1. A low flow, low Reynolds number cavitating venturi comprising:
   - an inlet for receiving a liquid at an upstream pressure;
   - a converging portion extending from said inlet and defined by a converging sidewall, said converging portion having a length $L_C$;
   - a throat portion extending from said converging portion and defined by a throat sidewall, said throat portion having a length $L_T$ and a diameter $D_T$, said length $L_C$ divided by said diameter $D_T$ being less than about (0.25) and said length $L_T$ divided by said diameter $D_T$ being less than about (0.20);
   - a diverging diffuser portion extending from said throat portion and defined by a diverging sidewall; and
   - an outlet for discharging said liquid received by said inlet at a downstream pressure, wherein said cavitating venturi provides a substantially stable liquid flow rate independent of said downstream pressure up to a downstream pressure at least as high as 80% of said upstream pressure at a Reynolds number of 60,000 or less.

2. The low flow, low Reynolds number cavitating venturi as defined in claim 1 wherein said inlet has a diameter $D_1$ of about 0.025 inches or less.

3. The low flow, low Reynolds number cavitating venturi as defined in claim 1 wherein said converging portion defined by said converging sidewall converges from said inlet in an overall angle of between about 55° to 66°.

4. The low flow, low Reynolds number cavitating venturi as defined in claim 1 wherein said length $L_C$ of said converging portion is about 0.004 inches or less.

5. The low flow, low Reynolds number cavitating venturi as defined in claim 1 wherein said diameter $D_T$ of said throat portion is about 0.02 inches or less.

6. The low flow, low Reynolds number cavitating venturi as defined in claim 1 wherein said length $L_T$ of said throat portion is about 0.003 inches or less.

7. The low flow, low Reynolds number cavitating venturi as defined in claim 1 wherein said throat sidewall is substantially perpendicular to said inlet.

8. The low flow, low Reynolds number cavitating venturi as defined in claim 1 wherein said diverging diffusion portion defined by said diverging sidewall diverges from said throat portion at an overall angle of between about 6° to 8°.

9. The low flow, low Reynolds number cavitating venturi as defined in claim 1 wherein said outlet has a diameter $D_O$ of about 0.060 inches.

10. The low flow, low Reynolds number cavitating venturi as defined in claim 1 wherein said outlet has a diameter $D_O$, the cross-sectional area of said outlet $A_O$ is defined by $\pi D_O^2$ divided by 4 and the cross-sectional area of said throat portion $A_T$ is defined by $\pi D_T^2$ divided by 4, wherein the cross-sectional area of said outlet $A_O$ divided by the cross-sectional area of said throat portion $A_T$ being equal to or greater than 10.

11. The low flow, low Reynolds number cavitating venturi as defined in claim 1 wherein said cavitating venturi is generally an elongated cylinder having an overall length of about 0.25 inches and a diameter of about 0.12 inches.

12. The low flow, low Reynolds number cavitating venturi as defined in claim 1 wherein said cavitating venturi is constructed of stainless steel.

13. The low flow, low Reynolds number cavitating venturi as defined in claim 1 wherein said cavitating venturi is mounted within a rocket thruster.

14. A bipropellant rocket thruster for operating in a bipropellant mode or in a monopropellant mode, said thruster comprising:

- a first inlet line for receiving a first liquid at a first upstream pressure;
- a first cavitating venturi for receiving said first liquid at said first upstream pressure, said first cavitating venturi having a converging portion having a length $L_C$ and a throat portion having a length $L_T$ and a diameter $D_T$, said length $L_C$ divided by said diameter $D_T$ being less than about (0.25) and said length $L_T$ divided by said diameter $D_T$ being less than about (0.20); and
- a decomposition chamber for receiving said first liquid discharged from said first cavitating venturi at a first downstream pressure, wherein said first cavitating venturi provides a substantially stable liquid flow rate of said first liquid independent of said first downstream pressure up to a first downstream pressure at least as high as 80% of said first upstream pressure at Reynolds number of about 60,000 or less.

15. The bipropellant rocket thruster as defined in claim 14 further comprising:

- a second inlet line for receiving a second liquid at a second upstream pressure;
- a second cavitating venturi for receiving said second liquid at said second upstream pressure; and
- a thrust chamber for receiving said second liquid discharged from said second cavitating venturi at a second downstream pressure, wherein said second cavitating venturi provides a substantially stable liquid flow rate of said second liquid independent of said second downstream pressure up to a second downstream pressure of at a least as high as 80% of said second upstream pressure at a Reynolds number of about 60,000 or less.

16. The bipropellant thruster is defined in claim 15 wherein said second cavitating venturi comprises:

- an inlet for receiving said second liquid at said second upstream pressure;
- a converging portion extending from said inlet and defined by a converging sidewall, said converging portion having a length $L_C$;
- a throat portion extending from said converging portion and defined by a throat sidewall, said throat portion having a length $L_T$ and a diameter $D_T$, said length $L_C$ divided by said diameter $D_T$ being less than (0.25) and said length $L_T$ divided by said diameter $D_T$ being less than (0.20);
- a diverging diffuser portion extending from said throat portion defined by a diverging sidewall; and
- an outlet for discharging said second liquid.

17. A low flow, low Reynolds number cavitating venturi comprising:

- an inlet for receiving a liquid at an upstream pressure;
- a converging portion extending from said inlet and defined by a converging sidewall which converges from said inlet at an angle of between about 55° to 65°;
- a throat portion extending from said converging portion and defined by a throat sidewall, said throat portion having a length $L_T$ and a diameter $D_T$, said length $L_T$ divided by said diameter $D_T$ being less than about (0.20);
- a diverging diffuser portion extending from said throat portion and defined by a diverging sidewall which diverges at an angle of between about 6° to 8°; and
- an outlet for discharging said liquid received by said inlet at a downstream pressure, said outlet having a diameter $D_O$, the cross-sectional area of said outlet being defined by $\pi D_O^2$ divided by 4 and the cross-sectional area of said throat portion being defined by $\pi D_T^2$ divided by 4, the cross-sectional area of said outlet divided by the cross-sectional area of said throat being equal to or greater than 10, wherein said cavitating venturi provides a stable liquid flow rate independent of said downstream pressure up to a downstream pressure as high as 80% of said upstream pressure at a Reynolds number of about 60,000 or less.

18. The low flow, low Reynolds number cavitating venturi as defined in claim 17 wherein said converging portion has a length $L_C$ wherein said length $L_C$ divided by said diameter $D_T$ is less than about (0.25).

19. A bipropellant rocket thruster for operating in a bipropellant mode or in a monopropellant mode, said thruster comprising:

a first inlet line for receiving a first liquid at a first upstream pressure;

a first cavitating venturi for receiving said first liquid at said first upstream pressure, said first cavitating venturi having a converging portion having a length $L_C$ and a throat portion having a length $L_T$ and a diameter $D_T$, said length $L_C$ divided by said diameter $D_T$ being less than about (0.25) and said length $L_T$ divided by said diameter $D_T$ being less than about (0.20); and a decomposition chamber for receiving said first liquid discharged from said first cavitating venturi at a first downstream pressure, wherein said first cavitating venturi provides a substantially stable liquid flow rate of said first liquid independent of said first downstream pressure.

* * * * *